United States Patent
Bernsley (10) Patent No.: US 7,444,069 B1
(45) Date of Patent: Oct. 28, 2008

(54) METHOD FOR CREATING AND EXHIBITING MULTIDIMENSIONAL INTERACTIVE STORIES

(76) Inventor: Mark Bernsley, 22820 Calabash St., Woodland Hills, CA (US) 91364

(*) Notice: Subject to any disclaimer, the term of this patent is extended or adjusted under 35 U.S.C. 154(b) by 1142 days.

(21) Appl. No.: 10/461,551

(22) Filed: Jun. 12, 2003

(51) Int. Cl.
H04N 5/00 (2006.01)

(52) U.S. Cl. .................................... 386/126
(58) Field of Classification Search ......... 386/125–126, 386/70, 98, 108, 112
See application file for complete search history.

(56) References Cited

U.S. PATENT DOCUMENTS

| | | | |
|---|---|---|---|
| 4,847,700 A | 7/1989 | Freeman | |
| 5,732,185 A * | 3/1998 | Hirayama et al. | 386/70 |
| 5,781,730 A | 7/1998 | Reimer | |
| 5,894,320 A | 4/1999 | Vancelette | |
| 6,002,833 A | 12/1999 | Abecassis | |
| 6,009,234 A | 12/1999 | Taira | |
| 6,151,444 A | 11/2000 | Abecassis | |
| 6,181,869 B1 * | 1/2001 | Kaneshige et al. | 386/70 |
| 6,269,216 B1 | 7/2001 | Abecassis | |
| 6,298,482 B1 | 10/2001 | Seidman | |
| 6,311,013 B1 * | 10/2001 | Shimizu et al. | 386/111 |
| 6,373,793 B1 * | 4/2002 | Sasaki et al. | 369/30.1 |
| 6,429,879 B1 | 8/2002 | Sturgeon et al. | |
| 6,463,207 B1 | 10/2002 | Abecassis | |
| 2002/0053089 A1 | 5/2002 | Massey | |
| 2002/0126983 A1 * | 9/2002 | Sato et al. | 386/46 |

* cited by examiner

*Primary Examiner*—Thai Tran
*Assistant Examiner*—Tat Chi Chio (57) ABSTRACT

A means of creating and means of exhibiting a multi-dimensional production consisting of two or more interrelated stories, story lines or story parts, in audio-visual media, by simultaneously delivering or streaming parallel "tracks" or "channels," between and among which the viewer(s) can alternate at will to create a variable, interactive audio-visual experience or product. The technology is adaptable to a variety of delivery systems including, but not limited to, commercial broadcast television, pay television (cable and satellite) and theatrical release (i.e., movies in theaters).

16 Claims, 4 Drawing Sheets

METHOD FOR CREATING AND EXHIBITING MULTIDIMENSIONAL INTERACTIVE STORIES

BACKGROUND OF THE INVENTION

1. Field of the Invention

The present invention relates to the manner of creating and exhibiting audio-visual presentations, such as television programs and digital motion pictures, and, more specifically, to a method for creating and exhibiting a new type of audio-visual content, consisting of a single story, delivered in related, parallel (i.e., simultaneously delivered) "tracks" or "channels" between which the viewer(s) can alternate.

2. Description of the Prior Art

Current and historical television and movies tell a story revealed through a combination of audio-visual components called "scenes." Although the writer and director can include the suggestion of many other sub-stories and sub-plots, generally only one specific set of scenes is developed and produced for serial exhibition. The exhibition of the program or movie therefore represents a single story product as told through a static beginning, middle and end.

Some articles addressing the promise of high-definition digital television have anticipated the ability to utilize different sub-channels to include different camera angles, particularly in sporting events. Different camera angles alone, however, do not enable the creation of deeper and more complex stories and story lines, as does the disclosed process.

Some games and DVD's have suggested the ability to select the direction of the plot line from a choice of pre-cut scenes which could then be assembled in new ways. The process of searching and adding the scenes is still clumsy and currently there is no way of adapting such technology to the broadcast, cable or theatrical environments.

Still other innovations have disclosed means to assemble scenes based on a viewer's preference, such as in response to ratings of sexual, violence or language content.

All of the pre-existing approaches involve the presentation of a serially assembled sequence of scenes In recent years, some experimentation has been done with live performance "stage plays" providing simultaneously unfolding plot lines. For example, the play Tamara by John Krizanc, first performed in 1981, involves over 100 scenes played in a large set in which the audience "invisibly" joins the actors. At the conclusion of each scene, the audience may elect to follow most any of the characters (who generally go in different directions) to their next scene in a different part of the set. The audience, which starts together, is fractioned as different groups follow different characters in separate and distinct scenes, joining again periodically at common scenes, intermission and the end of the play, at which time they can share their varied experiences. The overall story does not change, but the parts of it that an audience member chooses to see are highly variable. Further, once choosing a path or character to follow, an audience member cannot choose a different path until the next common scene involving several actors. That type of multi-dimensional live production cannot be replicated using traditional television or motion picture production methodologies or any previously disclosed process.

The following prior art patents are found to be relevant to the present invention:

1. U.S. Pat. No. 4,847,700 issued to on Jul. 11, 1989 for "Interactive "Interactive Television System For Providing Full Motion Synched Compatible Audio/Visual Displays From Transmitted Television Signals" (hereafter the "Freeman patent");

2. U.S. Pat. No. 5,781,730 issued to Reimer on Jul. 14, 1998 for "System And Method For Enabling The Creation Of Personalized Movie Presentations And Personalized Movie Collections" (hereafter the "Reimer patent");

3. U.S. Pat. No. 5,894,320 issued to Vancelette on Apr. 13, 1999 for "Multi-Channel Television System With Viewer-Selectable Video And Audio" (hereafter the "Vancelette patent");

4. U.S. Pat. No. 6,002,833 issued to Abecassis on Dec. 14, 1999 for "Disc Storing A Variable-Content-Video And A User Interface" (hereafter the "'833 Abecassis patent");

5. U.S. Pat. No. 6,009,234 issued to Taira on Dec. 28, 1999 for "Method Of Reproducing" (hereafter the "Taira patent");

6. U.S. Pat. No. 6,151,444 issued to Abecassis on Nov. 21, 2000 for "Motion Picture Including Within A Duplication Of Frames" (hereafter the "'444 Abecassis patent");

7. U.S. Pat. No. 6,269,216 B1 issued to Abecassis on Jul. 31, 2001 for "Intermittently Arranged Frames For Instantaneously Shifting Among Video Segments" (hereafter the "'216 Abecassis patent");

8. U.S. Pat. No. 6,298,482 B1 issued to Seidman on Oct. 2, 2001 for "System For Two-Way Digital Multimedia Broadcast And Interactive Services" (hereafter the "Seidman patent");

9. United States Patent Application Publication No. US 2002/0053089 A1 to Massey published on May 2, 2002 for "Methods And Apparatus For Presenting Interactive Entertainment" (hereafter the "Massey patent");

10. U.S. Pat. No. 6,429,879 B1 issued to Sturgeon on Aug. 6, 2002 for "Customization Schemes For Content Presentation In A Device With Converged Functionality" (hereafter the "Sturgeon patent");

11. U.S. Pat. No. 6,463,207 B1 issued to Abecassis on Oct. 8, 2002 for "Playing A Variable-Content-Video Having A User Interface" (hereafter the "'207 Abecassis patent").

None of the above prior art patents disclose the creative novel features of the present invention of having a multidimensional presentation having at least two interrelated stories, storyline or story parts in audio-visual media and simultaneously delivering parallel tracks of the at least two interrelated stories, storyline and story parts in a manner so that viewing can be alternated among the parallel tracks. In the prior art, it is either compartmentalized so that various prearranged components can be pieced together at the beginning and a viewer cannot alternate at any time from one track to the other track, or there are other methods of various prearranged programs that can be preselected at an initial time. None of these prior art patents disclose simultaneous streaming of parallel stories with divergent and convergent scenes so that a viewer can alternate between the multiplicity of various scenes to create his own individualized combination of story sequences.

SUMMARY OF THE INVENTION

The current invention provides a means of creating and means of exhibiting a multi-dimensional production consisting of two or more interrelated stories, story lines or story parts, in audio-visual media, by simultaneously delivering or streaming parallel "tracks" or "channels," between and among which the viewer(s) can alternate at will to create a variable, interactive audio-visual experience or product. The technology is adaptable to a variety of delivery systems including, but not limited to, commercial broadcast television, pay television (cable and satellite) and theatrical release (i.e., movies in theaters).

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The discussion herein addresses application of the invented method to the creation of a 2-track product, but the same process may be used for a plurality of interrelated stories or story parts, referred to herein interchangeably as "tracks" or "channels."

The disclosed process impacts the historical methods of writing, editing and exhibition, and to a lesser extent, production of audio-visual content.

Currently, a video program or theatrical motion picture represents a single set of scenes serially displayed, regardless of the method of assembling those scenes or the level of interactivity with the viewer in their assembly. The invention contemplates 2 or more interrelated stories or story lines, simultaneously streamed to the viewer in parallel, any track of which the viewer or viewers may select for viewing for any length of time and switch to any other track at any time. In the preferred embodiment, each and all tracks are capable of independent viewing in their entirety; i.e., rather than constituting substitutable components to be assembled, each and all tracks comprise a complete, independently viewable story, but are synergistically related to the other channels to provide the viewer with the ability to switch between the stories and story lines, for a different, richer, and/or otherwise more comprehensive experience.

In the preferred embodiment, each channel comprises a story parallel in time to other tracks, but addressing independent space and with common event "scenes." For example, independent Story (track) A might involve a series of scenes of a man preparing for a "blind date" and eventually going to pick her up, ending when he rings the doorbell. Story (track) B might involve the woman preparing for the same date and waiting for the man to arrive, ending when the doorbell rings. A common scene might begin when the door is answered and the couple is together. During exhibition, some viewers might watch track A, some track B, and some might switch between the two. All would watch the common scene. At any given time, track A would match B in time (at least approximately), although, except for the common scenes, they would reveal the events and experiences of different characters in different places. All three viewer groups could have a different viewing experience, and the extent to which they would be different would depend on the nature and content of the different tracks.

For digital, high definition programming, common scenes could be in high-definition, while independent story lines could be in sub-channels.

An alternative embodiment, but one still based on parallel time and independent space, involves no common scenes, but involves common events. For example, in the "blind date" scenario above, Story A might include only the man's story and "point of view" for the entire time, while Story B might include only the woman's story and "point of view," although the time dimension would remain parallel to provide some logical consistency and continuity in switching back and forth. In this embodiment, even the common event would involve different content and scenes, although both channels would be cumulative and synergistic in effect.

A second alternative embodiment involves parallel time but separate dimension; for example, where one track comprises the "real event," and a parallel track comprises flashbacks or concurrent character thought processes.

It is an object of this methodology to provide flexibility to the greatest extent possible to allow the creative process to flourish. Thus, by its nature, the various embodiments and applications of the method cannot be fully identified.

Method for Creating Multi-Dimensional Content.

The process of creating multi-dimensional content will become apparent through the disclosure of the medium and explanation of the differences between it and traditional media content.

Creation of a multi-dimensional content involves some requirements not present in creating stories for traditional media. In assembling a single sequence of scenes for traditional media (even when the sequence is variable and/or the process of their assembly interactive), the creator need not necessarily be concerned with the length (in time) of the individual scenes. They will flow logically in sequence regardless of length. There is no outside reference to which any given scene must coordinate.

Critical to creating a multi-track (multi-dimensional) story, however, is the need to ensure that the several "tracks" maintain a logical consistency relative to each other, such that a viewer switching between tracks at any time will view something logically consistent (e.g., in time or space) with the presentation of the other track(s). To accomplish that result, scriptwriting and editing is performed with a sensitivity to issues of "parallelism," "divergence," and "convergence." "Parallelism" addresses the importance that, at all times, each track contain content sufficiently related to the other track(s) so that switching between tracks at any time is contemplated and will provide cumulative and logically related content. Divergence and convergence refer to all tracks leaving or arriving at common scenes and content in a coordinated and timed manner. It is critical that all three issues be addressed in each story track in writing, production and editing.

Writing. Methods for writing scripts containing simultaneously unfolding story are known as evidenced by the play Tamara by John Krizanc, mentioned above, although such techniques have not heretofore been adapted to recorded or electronic media. In multi-dimensional live performances (i.e., "stage" plays), there is more flexibility in parallelism, in that the viewer can only switch at converged, common scenes. That limitation on audience choice in the context of stage plays makes writing for electronic media somewhat more difficult, as the script must contemplate viewer switches at any point in time.

Production. The production of individual scenes is not contemplated to vary significantly from current industry practices except insofar as necessary to retain parallelism, which will require particular sensitivity to time, and may have its most significant impact as it relates to the editing process. The timing of scenes is critical to maintain parallelism and to match the beginning and termination of common scenes across tracks. Interim independent scenes are less critical, as long as the logical relationship between tracks is maintained. As a result, interim scenes should incorporate an amount of beginning and ending material which can be edited to various lengths as necessary to accommodate otherwise inevitable variability between track scenes.

Editing is critical to maintaining parallelism, and convergence and divergence at common points. As a result, the beginning and end of each common scene must bear the identical time relationship to the beginning of the production to ensure that all tracks "meet" at common scenes simultaneously.

Figure 1:
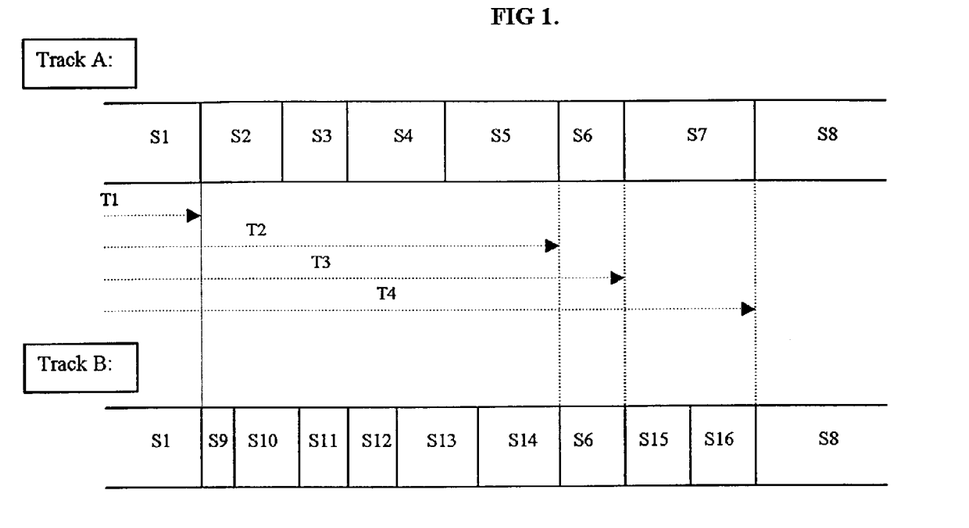
FIG. 1 is a an illustrative diagram of the present invention illustrating two tracks with one track containing Story A and one track containing Story B.

FIG. 1 illustrates two tracks, one containing Story A and one containing Story B. Scenes are denoted "S1," "S2," etc. and their variable length is indicated by the width of the boxes. Common scenes (i.e., scenes common to both stories) are indicated by their common identification, "S1," "S6" and "S8." To maintain parallelism, the beginning and ending time of common scenes from the beginning of the production, indicated by T1, T2 and T3, must be timed to be identical in both tracks. Further discussion of that process is addressed in "Maintaining Synchronization," below.

In order to inform viewers when alternative content is available on other tracks or channels, in the preferred embodiment a symbol is displayed in one or more of the corners of the screen to indicate that alternative content is available. In an alternative embodiment, a separate display on either the viewing box, the media player (e.g., DVD player) or synchronization box (described below) indicates the availability of alternative track content.

Storage

In the preferred embodiment, multi-dimensional stories are stored on laser-readable discs, such as DVD's. Each interrelated story, story line or story part comprises a separate and independent "track" or channel, that is designed to be read by a laser simultaneously with the other tracks/channels. Thus, there will need to be a plurality of tracks and a corresponding plurality of reading lasers, equal to the number of tracks the creator of the story has determined to include.

Current technology enables up to two layers of data on each of two sides of a DVD, with each layer capable of storing approximately one two hour movie. Depending on the DVD's storage capacity (single sided, single layer; single-sided, double layer; double-sided, single-layer; or double-sided, double layer) and the length of the production, one DVD could support 1, or four tracks of a multi-dimensional story. Currently applied technology utilizes one laser to read all tracks. This invention discloses a player comprising multiple lasers, each dedicated to reading only some of the tracks.

Retrieval (Reading)

Figure 2:
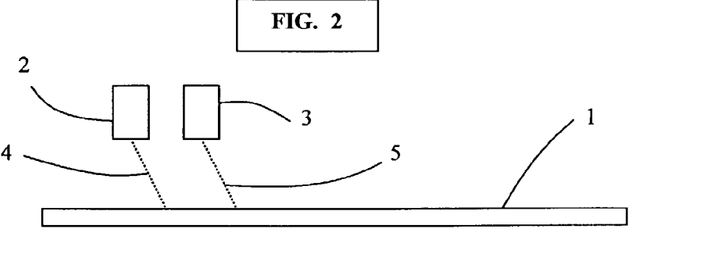
FIG. 2 is an illustrative diagram showing the present invention embodied on a single-sided double-layered DVD disk with two reading laser heads.
Figure 3:
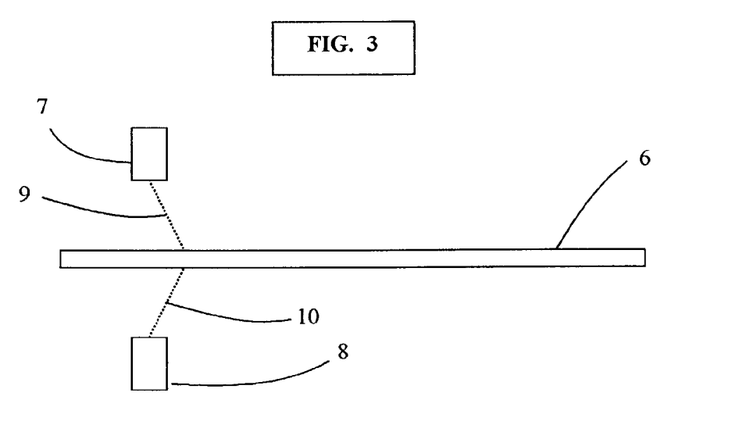
FIG. 3 is an illustrative diagram showing the present invention embodied on a double-sided single-layered DVD disk with two reading laser heads.
Figure 4:
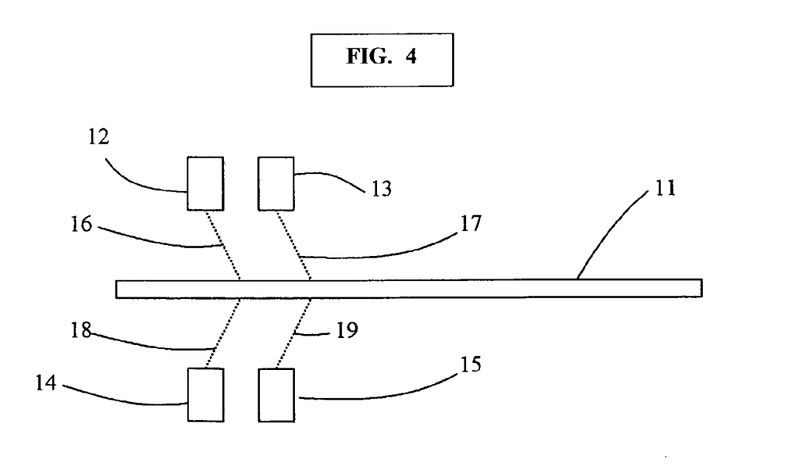
FIG. 4 is an illustrative diagram showing the present invention embodied on a double-sided double-layered DVD disk with four reading laser heads.

FIGS. 2 through 4 illustrate the laser configuration of multiple laser DVD players. FIG. 2 shows a side view of a single-sided, double-layered DVD disc, 1, with two reading laser heads, 2 and 3, respectively, and laser beams, 4 and 5, respectively. FIG. 3 shows a double-sided, single-layered DVD disc, 6, with two reading laser heads, 7 and 8, respectively, and laser beams, 9 and 10, respectively. FIG. 4 shows a double-sided, double-layered DVD disc, 11, with four reading laser heads, 12, 13, 14 and 15, respectively, and laser beams, 16, 17, 18 and 19, respectively.

It should be noted that for double-sided DVD's whose sides are intended to be read simultaneously, the tracks on each side would be written and read in reverse direction from the tracks on the other side, i.e., clockwise on one side and counterclockwise on the other side. The starting position of each track must be coordinated and standardized to allow the synchronization of reading lasers.

A plurality of DVD players, each containing 1, 2 or 4 lasers to read a like number of tracks could be utilized to access and stream several channels.

Exhibition

Exhibition of multi-dimensional stories, created as described above, can be displayed via a variety of media, including commercial broadcast and subscription television, home entertainment devices, such as DVD player devices designed for such media, and digital motion picture theatres. Mechanisms for each type of exhibition process, as well as features common to all, are disclosed below.

Maintaining Synchronization.

Critical to the delivery of multi-dimensional content in recorded media is the synchronization of the delivery of the various tracks (or channels). Synchronization can become a problem as a result of any or all of the following: (a) failure of the original content to be adequately synchronized in its creation; (b) alignment of lasers in a multi-laser player; or (c) synchronized play between multiple players, either as a result in a discrepancy in the moment of commencing play, pausing play, or as a result of discrepancies in the rate of play.

Corrections for failure of the original content to be adequately synchronized in its creation may, to some extent, be corrected by some of the means disclosed for correcting the other causes of synchronization lapses, but it is not an object of this invention to otherwise address major failures in production at the point of playback.

Because multiple heads reading a single DVD will, by definition, be reading a disk that starts and stops at the same time and spins at the same speed, synchronization of a multiple laser device can only lapse when the reading lasers fall out of alignment. This is viewed primarily as a fixed alignment issue, however, mechanical means for further adjustment of a laser's point of focus along the track may be incorporated and adjusted by a feedback mechanism in a manner similar to that discussed below.

In the preferred embodiment, synchronization of tracks from two or more players is maintained via a comparison of elapsed time from the start of the content. Means for encoding or otherwise tracking elapsed time in a stored stream of digital audio-visual content, as well as speeding up, slowing down or pausing the reading of such content, are well-known. A common example of the implementation of this knowledge is exhibited in home DVD players. When playing a DVD, a display shows the elapsed time from the beginning of the video presentation. Buttons are available for fast forwarding, reversing or pausing the play. Thus, it is known where the current point is along the length of the "track."

Disclosed below is a system of reading laser-readable discs in which a plurality of tracks on a single disc are read simultaneously. It is anticipated that the nature of such technology would maintain synchronization of the tracks automatically. Alternatively, a plurality of players may be synchronized.

Synchronization of separate players is maintained by comparing the elapsed time of each track via electronic processor and a simple software algorithm. If the tracks are not synchronized, i.e., at the same point from the origin, the lasers reading the "second" and subsequent tracks are advanced or slowed to match the elapsed time of the "first" track. For broadcast or cable television systems where the multiple channels are distributed to multiple locations for multiple viewers, each of which viewers potentially selecting a different channel at any time, it doesn't matter which track is designated the "first" track for the purpose of synchronization. With respect to localized exhibition, where only one channel is displayed at a given point in time, in the preferred embodiment of the current invention, the channel being displayed is designated as the first channel and those channels not being displayed are designated as the second and subsequent tracks.

In an alternative embodiment, potentially applicable in standard broadcast television where different tracks are broadcast by different channels, program start times, commercial breaks, restart times and segments are referenced to an independent and common time source, such as the National Bureau of Standards time. The independent broadcasters then synchronize their broadcast delivery of related channel content to adhere to the time reference milestones.

Track/Channel Selection

A means by which the viewer (or viewers) select which channel to view is provided, the precise embodiment of which may depend upon the medium used, as described below. The user thus selects which of the plurality of related content channels he/she wishes to view and only that channel is displayed. The other channels remain at all times synchronized and immediately available.

Figure 5:
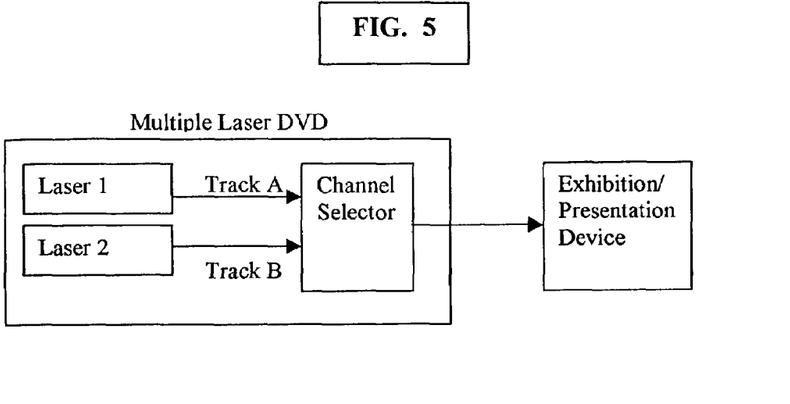
FIG. 5 illustrates a configuration of a multiple laser DVD player containing two lasers each reading and streaming an independent channel of content through a channel selector.

FIG. 5 illustrates a configuration of a multiple laser DVD player, containing two lasers, each reading and streaming an independent channel of content through a channel selector, which, in response to user selection, delivers only the channel desired by the user to the display device (such as a television set).

Figure 6:
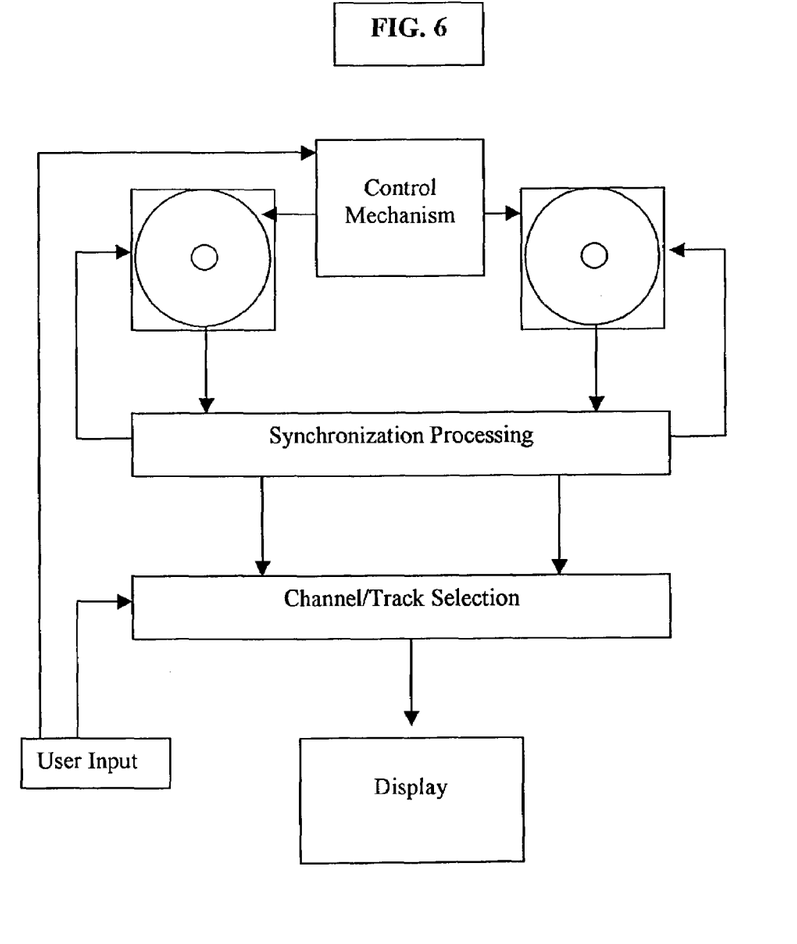
FIG. 6 is an illustrative diagram showing the configuration for the delivery of multi-dimensional content from two players.
Figure 7:
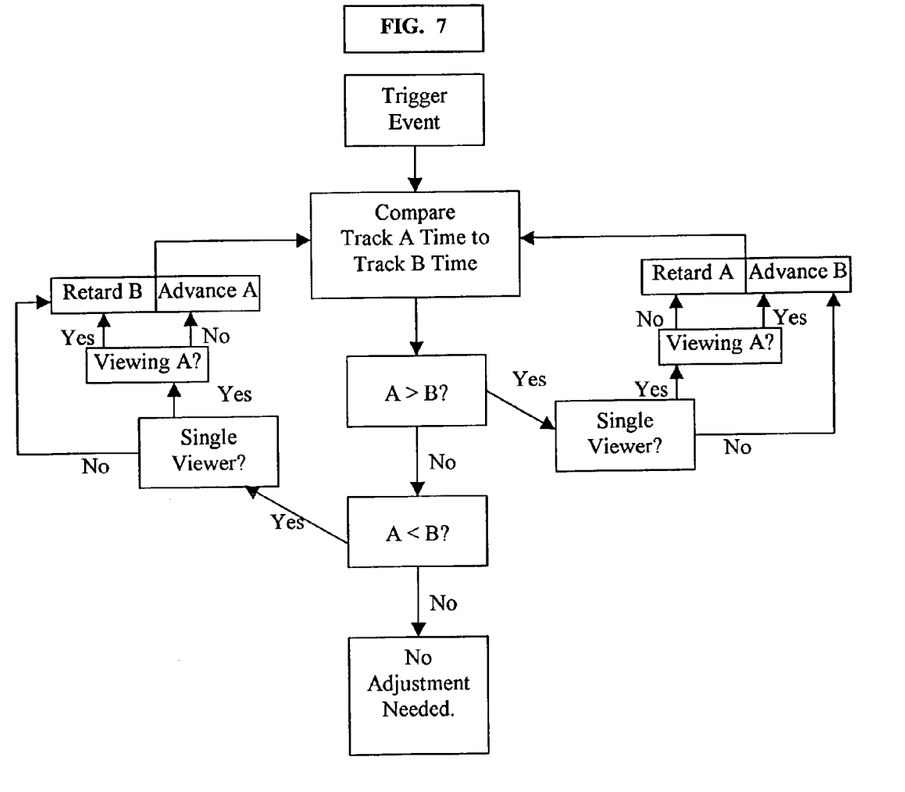
FIG. 7 is block chart diagram showing how the streams from the two tracks of FIG. 6 are synchronized via a synchronization mechanism.

FIG. 6 illustrates a configuration for the delivery of multi-dimensional content from two players. Play is simultaneously started, stopped, paused and otherwise controlled by the operator through a common control mechanism. Streams from the two tracks are synchronized via a synchronization mechanism which operates in accordance with an algorithm, such as that illustrated in FIG. 7. One of the synchronized streams is then selected for display by a track/channel selector, and the selected track is then displayed on the display mechanism.

Exhibition

Commercial Broadcast and Subscription Television, Satellite and Cable

The television exhibition of multi-track productions will require one channel (spectrum, broadcast, cable or satellite) for each track of the production. Each channel starts simultaneously to maintain channel parallelism. It is not required that the same owner broadcast both or all channels; for example, in the pre-digital television environment, one network or station can broadcast track A and another network or station can broadcast track B.

In the digital, high-definition, television environment, the option to broadcast common scenes in high definition using the entire spectrum is possible, while divergent story lines use the lower bandwidth (lower resolution) sub-channels. As current standards anticipate that each high definition channel incorporates four low resolution channels, a low resolution multi-track production (involving four or fewer tracks) could be broadcast by a single network or broadcaster.

Incorporation of Commercial Advertising

Commercial breaks can be incorporated into multi-track productions. The preferred method is to insert commercial breaks immediately before or after common scenes. All channels would thus have such commercial breaks at the same time and for the same length of time ("commercial time window"). The content of the commercial breaks need not be the same, however, and can be entirely different unless the commercial uses the same multi-track technology, in which case the advertiser will utilize both or all channels for the duration of that commercial production (but not longer than the commercial time window).

Additional (or alternative) commercial time windows can be incorporated in any one or more channels independently of the others. In that case, the placement and length of commercial time windows must be defined in advance and incorporated into the production and exhibition planning to make sure that parallelism was retained between all tracks at all times, i.e., so that opposite tracks anticipate the breaks and that whenever opposite tracks are displaying story content (rather than commercial), the content remains parallel across tracks.

DVD

Since, in the preferred embodiment, each track essentially comprises a potentially stand-alone story, any digital medium and player must contemplate both the synchronized progression of, and the seamless switching between, tracks. In the preferred embodiment, a dual-laser player would be required to play a double-sided DVD in order to provide exhibition of a 2-track production. Both sides would simultaneously read their respective tracks, which would be synchronized via simultaneous starting/stopping.

In an alternative embodiment, a timing track is added to each production track, indicating the time from start at each scene change. Coordinating circuitry maintains running times from start of each track, compares said timing tracks, and implements nominal delays of one or the other tracks at scene change points to maintain parallelism and coordinated play.

In an alternative embodiment, a simultaneous multiple DVD player would enable the synchronized play of two or more one or 2-sided DVD's with switching mechanisms.

Exhibition—theaters

The following discussion is limited to digital projection theatrical exhibition, as the application of the disclosed methods to film are considered impractical. Two issues confront the theatrical exhibition of multi-track video-plays: (1) Technology for displaying multi-channel screenplays and switching between channels, and (2) the method for channel selection in a multiparty audience environment.

The technology discussed for DVD should be applicable to theatrical exhibition. In the preferred environment, multiple DVD tracks (whether from a single player of multiple simultaneous DVD's, or from multiple DVD's) feed into a circuit switching mechanism which directs the selected channel to the projector. Alternatively, numerous projectors could simultaneously progress different channels, and the switching mechanism controls which projector is "live" (i.e., has its content actually projected to the screen); the other projector(s) would be "ghost" channels (keeping their unprojected content synchronized and ready for projection.).

When exhibiting a multi-channel production to a multiparty audience, some means must be provided both to implement channel selection and to aggregate and resolve conflicts in channel selection.

In the preferred embodiment, the channel selection mechanism comprises any number of networked selection devices connected (wired or wireless) to a networked computer with software capable of receiving signals from the selection devices. Each viewer in the audience has an electronic selector device to indicate their channel preference. Software compiles the selection results and also incorporates a "consensus" percentage set by the exhibitor. When the percentage of viewers desiring a channel other than the current channel reaches the consensus percentage, the software switches the channel for the audience. The device would also allow the exhibitor to deactivate the device so that only one channel is played for any given showing.

Defined in detail, the present invention is a method of creating and exhibiting audio-visual presentations, comprising: (a) a multi-dimensional production having at least two interrelated stories, storylines and story parts in audio-visual media; (b) simultaneously delivering parallel tracks of the at least two interrelated stores, storylines and story parts in a manner so that viewing can be alternated among the parallel tracks; and (c) each of the tracks delivered in parallel with all of the other tracks so that at all times, each track is sufficiently related to the other tracks so that switching between tracks at any time provides cumulative and logically related content.

Defined alternatively, the present invention is a method of creating and exhibiting audio-visual presentations, comprising: (a) a multi-dimensional production having at least two interrelated stories, storylines and story parts in audio-visual media; and (b) simultaneously delivering and streaming parallel tracks of the at least two interrelated stores, storylines and story parts in a manner so that viewing can be alternated among the parallel tracks.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A method of creating and exhibiting audio-visual presentations, comprising:
    a. a multi-dimensional production having at least two interrelated stories, storylines or story parts in audio-visual media;
    simultaneously delivering parallel tracks to the audience in the course of exhibiting the production, each of which parallel tracks contains a production of one of the at least two interrelated stories, storylines or story parts so that viewing can be alternated among the parallel tracks by the audience at the time of viewing; and
    c. each of the tracks delivered in parallel with all of the other tracks so that at all times, each track is sufficiently related to the other tracks so that switching between tracks at any time provides cumulative and logically related content.

2. The method of creating and exhibiting audio-visual presentations in accordance with claim 1, wherein the at least two interrelated stories, storylines or story parts are simultaneously streamed to the viewer in parallel so that any track that at least one viewer sees is selected for viewing for any length of time and the at least one viewer can switch to any other track at any time, said tracks being synergistically related for an enhanced viewing experience.

3. The method of creating and exhibiting audio-visual presentations in accordance with claim 1, wherein each and all tracks comprises a complete and independently viewable presentation of a story.

4. The method of creating and exhibiting audio-visual presentations in accordance with claim 1, further comprising means to indicate that alternative content is available.

5. The method of creating and exhibiting audio-visual presentations in accordance with claim 4, wherein the means to indicate that alternative content is available is a symbol displayed at a location on a viewing screen.

6. The method of creating and exhibiting audio-visual presentations in accordance with claim 4, wherein the means to indicate that alternative content is available is a display on a viewing box or media player.

7. The method of creating and exhibiting audio-visual presentations in accordance with claim 1, wherein each story is stored on at least one laser readable disk such that each of the plurality of tracks is stored on at least one laser disk and a corresponding laser reader is used to read each respective track.

8. The method of creating and exhibiting audio-visual presentations in accordance with claim 7, wherein the parallel tracks are stored on media in a manner allowing for each of such tracks to be read simultaneously with the others at playback by one of a plurality of reading means.

9. The method of creating and exhibiting audio-visual presentations in accordance with claim 1, wherein the multidimensional stories are delivered via broadcast television.

10. The method of creating and exhibiting audio-visual presentations in accordance with claim 1, further comprising the content of each track being coordinated so that all tracks arrive and leave at common scenes in a coordinated timely manner.

11. The method of creating and exhibiting audio-visual presentations in accordance with claim 1, wherein the multi-dimensional stories are delivered via motion pictures or satellite or cable.

12. The method of creating and exhibiting audio-visual presentations in accordance with claim 1, wherein each track comprises a story parallel in time to the other tracks but addresses independent space and common event scenes; or each track comprises a story parallel in time but in a separate dimension.

13. The method of creating and exhibiting audio-visual presentations in accordance with claim 12, wherein each separate dimension is either a realtime event or a parallel flashback event.

14. A method of creating a multi-track audio-visual presentation, the presentation comprising a plurality of audio-visual productions exhibited as simultaneous alternative content, the method comprising the steps of:

a. writing a plurality of scripts;

each script being sufficiently related to the other scripts so as to add and contribute to the communication of the single presentation;

each script providing content for one or more of the plurality of audio-visual productions;

each script being written so that each and all of the audio-visual productions remain, during the course of presentation, sufficiently related at all times to each and all other related productions, such that switching by the audience between the productions continues to provide content logically relevant to the overall story and audio-visual experience of which the plurality of scripts and productions are a part; and b. producing the plurality of audio-visual productions according to the plurality of related scripts;

each production being complete and independently viewable;

each production being related to the other related productions according to the plurality of related scripts in contributing to the presentation;

each production providing simultaneously available alternative content to each and all other related productions during the presentation;

each production having an exhibition time identical to each and all other related productions; and each production being organized to contain scenes of such length and in such order so that switching by the audience from one point in one production, to the same elapsed time point of any other related production, being parallel portions, continue to provide content logically relevant to and consistent with the overall presentation of which the plurality of scripts and productions are a part.

15. The method of claim 14, further comprising the step of storing the plurality of audio-visual productions in one or a plurality of media designed to accommodate access to any and each of the parallel portions of such productions at any time as part of the presentation.

16. A method of exhibiting a multi-track audio-visual presentation, the presentation consisting of a plurality of related, audio-visual productions, each presenting simultaneously available alternative content during the presentation, said method comprising the steps of:

making each and all of parallel portions of the plurality of related audio-visual productions available for exhibition at any time during the presentation;

providing an audience a means of selecting which of the plurality of related audio-visual productions to experience during each and all times during the presentation; and in response to the audience selection, switching the presentation from the related audio-visual production then being exhibited to the same elapsed time point in the related audio-visual production selected.

\* \* \* \* \*